Jan. 3, 1928. 1,655,157
J. MUIR
SURGICAL INSTRUMENT FOR IMPLANTING CAPILLARY
SEEDS CONTAINING RADIUM EMANATION
Original Filed Feb. 19, 1926  2 Sheets-Sheet 1
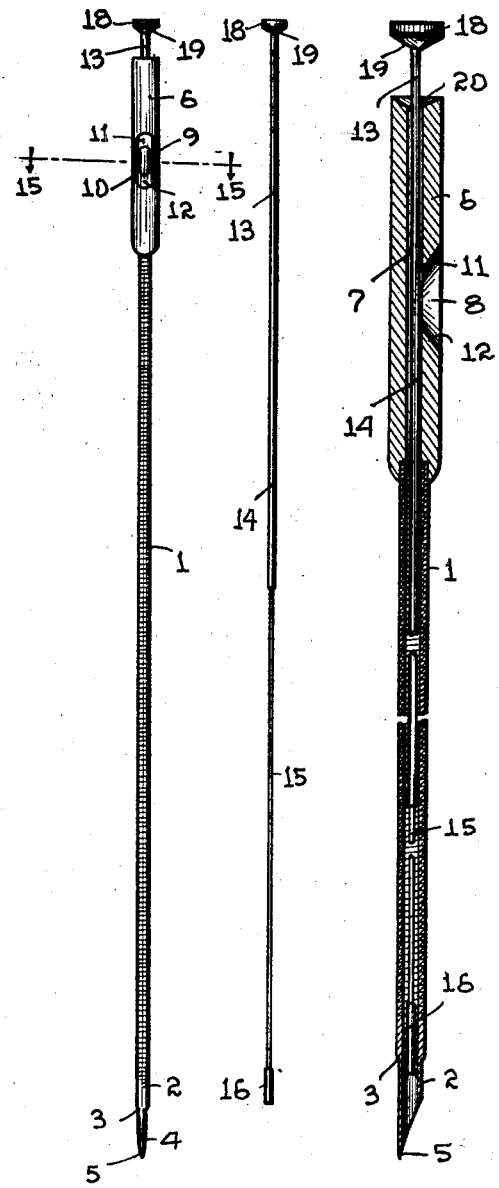
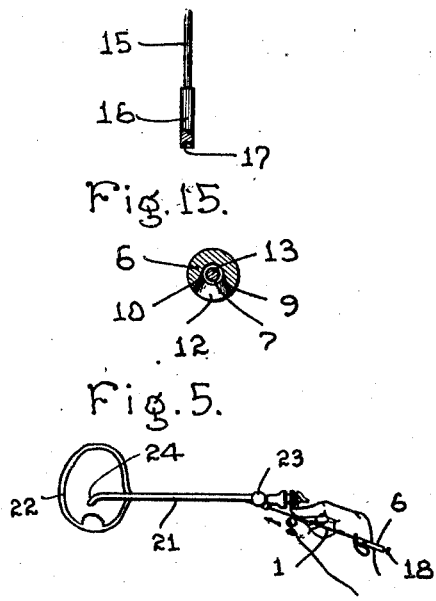
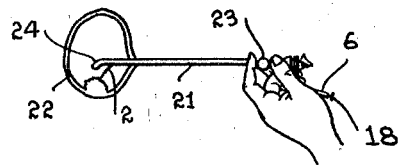
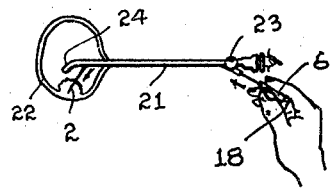
Inventor
JOSEPH MUIR
By Ivan P. Tacky,
Attorney Jan. 3, 1928.   1,655,157
J. MUIR
SURGICAL INSTRUMENT FOR IMPLANTING CAPILLARY
SEEDS CONTAINING RADIUM EMANATION
Original Filed Feb. 19, 1926    2 Sheets-Sheet 2

Inventor
JOSEPH MUIR
By Ivan P. Tashof,
Attorney

Patented Jan. 3, 1928.

1,655,157

UNITED STATES PATENT OFFICE.

JOSEPH MUIR, OF NEW YORK, N. Y., ASSIGNOR TO THE RADIUM EMANATION CORPORATION, OF NEW YORK, N. Y., A CORPORATION OF DELAWARE.

SURGICAL INSTRUMENT FOR IMPLANTING CAPILLARY SEEDS CONTAINING RADIUM EMANATION.

Original application filed February 19, 1926, Serial No. 89,402. Divided and this application filed May 5, 1926. Serial No. 106,900.

This invention relates to the provision of an instrument for implanting radium emanation capillary tubes or seeds in solid bladder tissue or the like through the cystoscope.

The cystoscope referred to is an instrument to explore the human bladder as well as the urethra, and is used when a bougie, which is flexible, is inserted through the cystoscope into the bladder to apply medications under visual observation. The cystoscope is provided at the bladder end with a small source of light to secure vision and adjacent to this source of light is a tube opening connection to the eye piece end of the cystoscope. Between the source of light and the opening of the tube is an "elevator" which is merely a lever adapted to direct the position of the end of the bougie introduced through the cystoscope and into the bladder. The elevator permits the bending of the end of the bougie to an angle of approximately 90°.

As is clear from the examination of Figures 5 to 14 inclusive, the seed tube or bougie entrance on the vision end of the cystoscope is set at an angle of approximately 35° to the main tubular body of the cystoscope. Any bougie in being passed through the cystoscope is subjected to two bends: first, the permanent entrance bend and second, the adjustable bend caused by directing the end of the bougie by means of the elevator.

The primary object of the present invention is to provide an instrument which will permit the implantation of radium emanation tubes in the bladder through a cystoscope. Briefly, the instrument is characterized by the following features:

(1) It is provided with a flexible cannula slidably fitting in the cystoscope, the flexibility of the cannula being sufficient to take the initial bend of the side tube of the cystoscope and also the final sharp bend induced by the manipulation of the cystoscope "elevator"; and at the same time permit the free passage of seeds or tubes containing radium emanation through the bend of cannula when the tubes are pushed forwardly by the plunger.

(2) A tubular piercing needle is permanently attached to the bladder end of the flexible cannula.

(3) The flexible cannula has a tubular metal barrel at the end remote from the bladder end, said barrel embodying a loading slot for seeds or tubes and consisting of a countersunk groove having walls extending at an acute angle to each other and to the axis of the initial barrel.

(4) A plunger portion is provided fitting slidably along the tubular barrel, cannula and needle, the length of the plunger proper being approximately equal to the overall length of the cannula, needle, and barrel. The plunger must be highly resilient and flexible in order to take the first bend of the cystoscope and thereafter the sharp bend induced by the "elevator". At the same time, the plunger when introduced into the cannula must give the instrument high resistivity so that when pressure is applied, holding the instrument by the heavy metal barrel body, the pressure will be transmitted along the instrument and the two bends sufficiently to pierce the diseased tissue with the needle at the end of the flexible cannula. In order that the plunger may accomplish the above it preferably comprises a flexible main portion and a flexible and highly resilient thin end portion. The flexible main portion takes the first bend of the cystoscope, while the flexible and highly resilient thin end portion takes the very sharp and variable bend induced by the manipulation of the cystoscope "elevator".

(5) While the above described form of plunger gives fairly satisfactory results, it is preferred that the instrument plunger be provided with an end plunger plug and this is especially desirable when using a plunger having a relatively thin end plunger portion. Such an end plunger portion has many advantages which will be pointed out in detail later.

In the accompanying drawing,

Fig. 1 is a plan view of the instrument.

Fig. 2 is a plan view of the plunger portion.

Fig. 3 is a cross sectional view showing the coiled wire cannula and the plunger portion comprising a flexible main wire portion and a flexible and resilient thin end portion.

Fig. 4 is a detail of a modified end plunger plug, one end of the latter being hollowed out to form a pocket in which the hemispherical end of a seed will fit.

Figure 8:
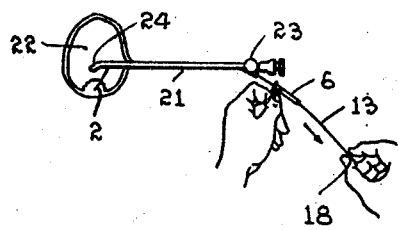

Figs. 5 to 14 inclusive diagrammatically show the application of the instrument to the implantation of seeds into the bladder, through the cystoscope.

Fig. 15 is a cross section on an enlarged scale on line 15—15 of Fig. 1 illustrating in detail the means provided for permitting the introduction of a seed or seeds into the instrument at a point remote from the discharge end of the instrument.

Fig. 16 is a detail showing the end plunger portion in direct contact with a seed; and Fig. 17 is a detail showing the modified type of end plunger plug in direct contact with a seed.

The instrument comprises a cannula 1 which consists of wound wire material which may be coiled such as constitutes the sheath of the well known Bowden wire, the use of such a flexible material permitting the cannula 1 to slidably fit in the cystoscope and at the same time be flexible enough to take the initial bend of the side tube of the cystoscope and also the final sharp bend induced by the manipulation of the cystoscope "elevator" and at the same time permit the free passage of seeds containing radium emanation through the bends of the cannula when the tubes are pushed forwardly by the plunger as is shown in Figs. 8 to 14 inclusive. Permanently attached to the bladder end of the cannula 1 is the tubular piercing needle 2 provided with a shoulder 3, the end of the needle being beveled diagonally as at 4, the discharge end of the needle being indicated by the numeral 5.

Permanently secured to cannula 1 at its other end is a receiving member such as a tubular metal barrel 6 having a bore 7 and adjacent to the union of the barrel 6 with cannula 1, there is formed in the barrel a countersunk groove or a slot 8 communicating with the bore 7 and permitting the insertion of emanation seeds or tubes therein. The slot or groove 8 extends longitudinally of the barrel 6. The groove 8 has side walls 9 and 10 and end walls 11 and 12 all extending at an acute angle to the axis of the bore 7. The uppermost portions of the walls 9 and 10 are in a plane slightly below the level of the plane defined by the uppermost portion of the walls 11 and 12, said uppermost portions of the walls 11 and 12 being in the circular plane of the barrel 6. It is to be understood that while the cannula 1 alone has been specifically referred to as the cannula this member together with the needle 2 and the barrel 6, as a whole, may constitute the cannula. In other words, it is within the province of the invention to form the members 1, 2 and 6 integral and in the nature of a metallic tube, although the arrangement shown in the drawing is an advantageous one.

The ejector member or plunger of the instrument is indicated in general by the numeral 13 and comprises a flexible main portion 14 and a flexible and highly resilient thin end portion 15. As will be noted by referring to Fig. 2, the diameter of the thin end portion 15 is relatively much less than that of the main plunger portion 14. This gives greater flexibility and resiliency. The flexible main portion 14 takes the first bend of the cystoscope while the flexible and highly resilient thin end portion 15 takes the very sharp and visible bend induced by the manipulation of the cystoscope "elevator". The end plunger portion 15 is provided with an end plunger plug 16, which is of such a diameter that it fits slidably along the bore of the cannula, and approximates the diameter of the bore. The end plunger plug 16 functions to prevent the overriding of the seed by the plunger portion 15. As shown in Fig. 16, the end of a seed to be implanted is a perfect hemisphere and when the seed itself is penetrating tissue, pressure must be applied along the axis of the seed. The plug 16 enables the application to the seed of pressure along the horizontal axis thereof and passing through the center of the seed. The end of the plunger may be hollowed out at 17 as shown in Fig. 4 to form a pocket in which the hemispherical end of the seed will fit. The end plunger plug 16 prevents the thin plunger portion 15 from binding and buckling as it passes along the bends in the cannula 1 when the latter is used in conjunction with the cystoscope. The main plunger portion 14 and the plunger plug 16 are preferably made of Monel metal and the flexible and resilient thin plunger portion 15 is preferably made of German silver. The plunger 13 is provided with a head 18 having a beveled undersurface 19 adapted to be seated in a complemental depression 20.

The use of the instrument will be clear from an examination of Figs. 8 to 14 inclusive. Fig. 5 shows the cystoscope 21 in place in a bladder 22 and the flexible instrument being passed into the cystoscope under visual observation until the tip of the implantation instrument appears in the field of vision, the cystoscope 21 having at the bladder end 24 thereof a source of light to secure vision. As soon as the needle 2 appears in the field of vision, the operator as shown in Fig. 6 directs the point thereof, to the chosen spot by proper manipulation of the cystoscope and its elevator, and by advancing the instrument according to need. The elevator is controlled by elevator screw 23.

Figure 9:
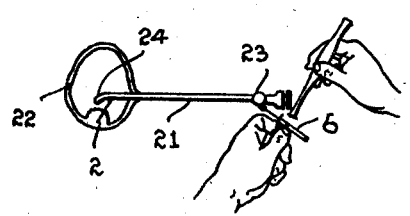

The needle point 5 of the instrument being in the position desired for implantation, the flexible cannula is pushed ahead, its gradual entry into the tissue being under constant observation. This is shown in Fig. 7. The depth of penetration can be easily gauged by the eye as well as the "feel of the cannula" as it advances into the cystoscope 21. As should be noted throughout this procedure, the plunger 15 remains undisturbed. As shown in Fig. 8, the needle tip of the instrument and part of the carrier having been introduced as far as desired, for the placement of the first seed, the plunger 13 comprising the main plunger portion 14, the highly flexible and resilient ejector portion 15 and the end plunger 16, is entirely withdrawn. Visional operation may be safely interrupted at this point, as the needle is firmly embedded in the tissue. Thereafter, as shown in Fig. 9, the instrument or carrier may be loaded with the seed. The operator continues to hold the cystoscope and instrument, and an assistant places a seed in the loading slot, holding the instrument or carrier with a detachable handle.

Figure 12:
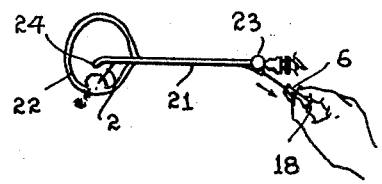
Figure 10:
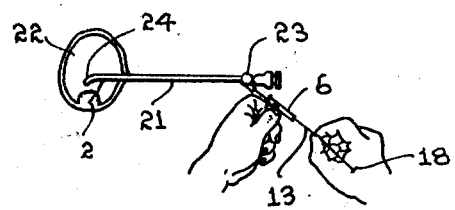
Figure 11:
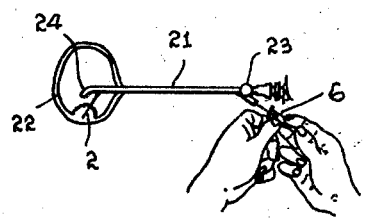

As shown in Fig. 10, the plunger portion of the instrument is now introduced by an assistant into the cannula 1 and care is exercised to push the seed safely into the lumen. The pressure is continued until only about the last one-half inch of the plunger remains outside of the cannula 1 and barrel 6. As shown in Fig. 11 the seed is now pushed home preferably under visual operation as shown by the eye in front of the cystoscope. Whenever, as is usual, other seeds are to be implanted in the same portal of entry, the plunger portion of the instrument is withdrawn as shown in Fig. 12 to whatever distance desired, the visual observation of the embedded portion of the carrier affording a perfect estimate as to distance. As many seeds as are considered necessary, are implanted into the same portal of entry, in successive steps. The last seed for any given puncture channel or portal of entry having been implanted, the needle is not entirely withdrawn but only to the extent of about one-half inch.

Figure 13:
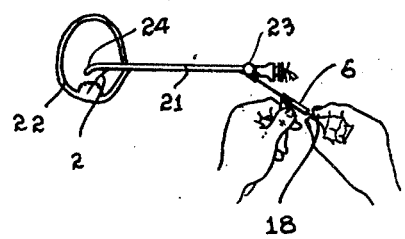
Figure 14:
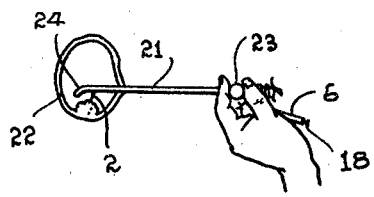

Fig. 13 shows the position before the withdrawal and Fig. 14 shows the position of the piercing needle 2 after withdrawal. Holding the field under observation, the operator selects the next portal of entry and then proceeds to distribute the seeds as above set forth.

This application is a division of application Serial No. 89,402, filed February 19, 1926, by Joseph Muir, the latter being a continuation in part of application Serial No. 709,800, filed April 29, 1924.

I claim:

1. An instrument for implanting capillary seeds or tubes containing radium emanation in solid tissue in the bladder through an operating cystoscope comprising a resilient and flexible cannula adapted to take the initial bend of the side tube of the cystoscope and also the final sharp bend induced by the manipulation of the cystoscope elevator, a tubular piercing needle at the bladder end of the cannula, a receiving member at the other end of the cannula, a receiving opening therein for the insertion of emanation seeds and a plunger slidably fitting in said cannula and receiving member comprisng a flexible main portion and a flexible and highly resilient thin end portion provided with a plunger plug, the flexible main portion being adapted to take the first bend of the cystoscope, and the flexible and highly resilient thin end portion, the sharp and visible bend induced by the manipulation of the cystoscope elevator, said instrument when in use permitting the free passage of the emanation seed through the cannula bends when the seed is pushed forwardly by the plunger.

2. A plunger for use in an instrument for implanting seeds containing radium emanation in solid tissue in the bladder through an operating cystoscope comprising a flexible main portion, a flexible and highly resilient thin end portion and a plug secured to said resilient thin end portion approximately the size of the bore in which the plunger works, whereby pressure may be applied along the horizontal axis of the seed and passes through the approximate center thereof, said plunger plug preventing said thin end portion from binding and buckling as it passes along the bends of the cannula bore in which the plunger works.

3. A plunger for use in an instrument for implanting seeds containing radium emanation in solid tissue in the bladder through an operating cystoscope comprising a flexible main portion, a flexible and highly resilient thin end portion and a plug hollowed out at its end and secured to said resilient thin end portion of approximately the size of the cannula bore in which the plunger works, whereby pressure may be applied along the horizontal axis of the seed and passes through the pressure center thereof, said plunger-plug preventing said thin end portion from binding and buckling as it passes along the bends of the cannula bore in which the plunger works.

4. In combination, a cystoscope and an instrument for implanting seeds or tubes containing radium emanation in solid tissue and operating through said cystoscope, said instrument comprising a resilient and flexible cannula consisting of a wound wire whereby the cannula is adapted to take the initial bend of the side tube of the cystoscope and also the final bend induced by the manipulation of the cystoscope elevator, a tubular piercing needle at the bladder end of the cannula, a receiving member at the other end of the cannula, a receiving opening therein for the insertion of emanation seeds and a plunger slidably fitting in said cannula and receiving member comprising a flexible main portion and a flexible and highly resilient thin end portion provided with a plunger plug, the flexible main portion being adapted to take the first bend of the cystoscope and the flexible and highly resilient thin end portion, the sharp and visible bend induced by the manipulation of the cystoscope elevator, said instrument when in use permitting the free passage of the emanation seeds through the cannula bends when the seed is pushed forwardly by the plunger.

5. An instrument for implanting capillary seeds or tubes containing radium emanation in solid tissue through an operating cystoscope comprising a resilient and flexible cannula consisting of a wound wire whereby the cannula is adapted to take the initial bend of the side tube of the cystoscope and also the final sharp bend induced by the manipulation of the cystoscope elevator, a tubular piercing needle at the end of the cannula, a receiving opening in said cannula in communication with the cannula bore adapted to receive emanation seeds, and a plunger member slidably fitting in the bore of the cannula and provided at its ejector end with a plunger plug adapted to prevent said plunger from binding and buckling as it passes along the bends of the cannula bore.

6. An instrument for implanting capillary seeds or tubes containing radium emanation in solid tissue in the bladder through an operating cystoscope comprising a resilient cannula having a tubular piercing end and provided at a point in its length, inwardly of said end with a receiving opening in communication with its bore, and a resilient plunger or ejector member slidably fitting in the bore of the cannula, said ejector member being provided at its ejector end with a plunger plug adapted to prevent said plunger from binding and buckling as it passes along the bends of the cannula bore.

In testimony whereof he hereunto affixes his signature.

JOSEPH MUIR.